United States Patent Office 3,013,957
Patented Dec. 19, 1961

3,013,957
HIGH ENERGY RADIATION METHOD FOR PRODUCTION OF FOAMED POLYMERS
Fred Berry Waddington, Sale, England, assignor to Metropolitan-Vickers Electrical Company Limited, London, England, a British company
No Drawing. Filed Dec. 9, 1957, Ser. No. 701,289
Claims priority, application Great Britain Jan. 11, 1957
4 Claims. (Cl. 204—154)

This invention relates to the preparation of foamed polymers, particularly those types which are known to the general public as foam rubbers. Foamed polymeric materials are usually produced by the action of thermally unstable blowing agents which are milled, or otherwise incorporated into the material. Application of heat to the mixture decomposes the blowing agent, and gaseous products of the decomposition serve to expand the material into the form of a foam. The use of heat for this purpose is often disadvantageous, for example in the application of foamed materials to the potting of stress-sensitive electrical components, and in cases where foamed materials are to be combined with heat-sensitive materials, whilst a further disadvantage is that the extent of gas-evolution and hence of foaming is not readily controllable.

An important object of the present invention is to overcome these disadvantages, and this has been made possible by the discovery that some of these thermally unstable blowing agents are readily decomposed by exposure to high energy radiation without the application of heat; and further that the quantity of gas evolved is controllable, within the limit of total gas-evolution, by the amount of radiation received.

This invention therefore consists in a method of producing a foamed polymeric material without the application of heat, which comprises mixing a polymerisable material with a blowing agent and exposing the mixture to high energy radiation for a time that is just sufficient to cause decomposition of the blowing agent to the required extent.

A convenient source of high energy radiation is a travelling wave linear accelerator, which may be adapted for this type of irradiation in the manner described by C.W. Miller (British I.R.E., 14, No. 12, December 1954), and A. C. Baskett and C. W. Miller (Nature, 174, 3rd and 4th, August 1954).

The following thermally unstable compounds have been subjected to doses of electrons from an accelerator so adapted. The dose rate was for experimental convenience a nominal 1 mrad* per minute and the temperature of the samples did not at any time exceed 40° C.

| Blowing agent | Quantity of gas evolved on irradiation |
|---|---|
| Benzoyl peroxide | 0.5 ml./gm./mrad. |
| αα′ azo-di-isobutyronitrile (Genitron AZDN) | 0.25 ml./gm./mrad. |
| Azo-cyclohexanoic dinitrile | 0.1 ml./gm./mrad. |

*1 rad=100 ergs per gram.

As an example of the foaming action of one of these compounds, 3% by weight of Genitron AZDN was milled into a natural rubber and the mixture exposed to 4 mev. electrons from an accelerator as referred to above. The dose rate was 1 mrad per minute and again the temperature of the specimen remained below 40° C. After a dose of 30 mrad the rubber had expanded in volume and when cut showed a marked cellular structure. The dose of 30 mrad was in this case sufficient to give the rubber a substantial degree of cure, so ensuring that the foamed structure was permanent.

Two obvious advantages of this method of producing a foam are that no heating of the material need take place and that the degree of foaming can be controlled to some extent by the irradiation dose received.

It is, of course, essential that the quantity of radiation required to bring about the foaming should not in any way damage the materials involved; on the contrary it is often desirable that the irradiation should produce an upgrading effect, as from a liquid to a solid, or from a thermoplatsic to a thermoset material; and the process of the invention enables such desired effects to be achieved in the case of materials which polymerize or cross-link when irradiated.

The invention is thus particularly applicable to the foaming of materials which are known to cross-link under irradiation, such as natural rubbers and some synthetic rubbers. However, it will be appreciated that the process is readily applicable to the production of other foamed polmeric materials; for example, it is generally acknowledged that vinyl monomeric materials polymerise under irradiation. Such monomeric liquids (e.g. styrene) can be formed into a paste with an inert filler (e.g. silica) and a quantity of one of the abovementioned blowing agents added and the whole irradiated. By varying the quantity of blowing agent and the irradiation dose received, the properties of the resulting foamed polymer can readily be controlled.

The type of irradiation is not limited to electron bombardment; equivalent doses of other forms of high energy radiation, e.g. X-rays and gamma-rays, may be applied.

What I claim is:

1. The method of producing a foamed polymeric material without application of heat which comprises mixing a natural rubber with a blowing agent that evolves a predeterminable quantity of gas on irradiation and which is selected from the class consisting of benzoyl peroxide, azo-cyclohexanoic dinitrile and αα′ azo-di-isobutyro-nitrile, and thereafter decomposing the said material mixed with said natural rubber by exposing the mixture to a stream of accelerated electrons in the amount of approximately 30 mrad at a dose rate of approximately 1 mrad per minute until the required amount of foaming has been obtained, said blowing agent mixed with said rubber being approximately 3% of the mixture by weight.

2. The method of producing a foamed polymeric material without application of heat which comprises mixing a monomeric vinyl compound with a blowing agent that evolves a quantity of gas on irradiation and which is selected from the class consisting of benzoyl peroxide, azo-cyclohexanoic dinitrile and αα′ azo-di-isobutyro-nitrile, and thereafter decomposing the blowing agent by exposing the mixture to a stream of accelerated electrons in the amount of approximately 30 mrad at a dose rate of approximately 1 mrad per minute until the required amount of foaming has been obtained, said blowing agent being approximately 3% of the mixture by weight.

3. The method of producing a foamed polymeric material without application of heat which comprises mixing a substance that undergoes polymerization when subjected to high energy radiation with a blowing agent selected from the class consisting of benzoyl peroxide, azo-cyclohexanoic dinitrile and αα′ azo-di-isobutyro-nitrile, and decomposing the blowing agent by exposing the mixture to a dosage of high energy radiation in the form of a stream of accelerated electrons in the amount of approximately 30 mrad at a dose rate of approximately 1 mrad per minute.

4. The method of using a source of irradiation which emits a stream of accelerated electrons the steps comprising providing for a mixture of natural rubber and a blowing agent that evolves a predetermined quantity of gas on irradiation and which is selected from the class consisting of benzoyl peroxide, azo-cyclohexanoic dinitrile and αα' azo-di-isobutyro-nitrile, wherein the blowing agent is approximately 3% of the mixture by weight, and decomposing said blowing agent in said mixture by exposing said mixture at a temperature level which is below the temperature at which said mixture softens, to the stream of accelerated electrons in the amount of approximately 30 mrad at a dose rate of approximately 1 mrad per minute to thereby foam said mixture.

References Cited in the file of this patent

UNITED STATES PATENTS

| | | |
|---|---|---|
| 1,906,402 | Newton | May 2, 1933 |

FOREIGN PATENTS

| | | |
|---|---|---|
| 144,807 | Australia | Jan. 21, 1952 |
| 730,476 | Great Britain | May 25, 1955 |

OTHER REFERENCES

Hunter et al.: "I. & E. Chem.," vol. 44, pp. 119–122 (1952).

"Science News Letter," vol. 67, p. 101, Feb. 12, 1955.